US009305330B2

(12) United States Patent
Chand et al.

(10) Patent No.: US 9,305,330 B2
(45) Date of Patent: Apr. 5, 2016

(54) PROVIDING IMAGES WITH ZOOMSPOTS (71) Applicant: MICROSOFT CORPORATION, Redmond, WA (US)

(72) Inventors: Rajeev Kumar Chand, Redmond, WA (US); Faisal Nasim, Redmond, WA (US); Andres De Vivanco Castro Mendivil, Seattle, WA (US); Sander Martijn Viegers, Seattle, WA (US); Shree Lakshmi Jayachandra Rao, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 13/660,775

(22) Filed: Oct. 25, 2012

(65) Prior Publication Data
US 2014/0118405 A1    May 1, 2014

(51) Int. Cl.
G09G 5/00    (2006.01)
G06T 3/40    (2006.01)
G06F 17/30   (2006.01)

(52) U.S. Cl.
CPC .............. G06T 3/40 (2013.01); G06F 17/3087 (2013.01)

(58) Field of Classification Search
None
See application file for complete search history.

(56) References Cited

U.S. PATENT DOCUMENTS

| 8,046,705 | B2 | 10/2011 | Hunleth et al. |
| 8,269,797 | B2 * | 9/2012 | Uchida et al. ................. 345/668 |
| 8,274,524 | B1 | 9/2012 | Cornell et al. |
| 2002/0163547 | A1 * | 11/2002 | Abramson et al. ............ 345/855 |
| 2009/0089707 | A1 | 4/2009 | Knowles |
| 2010/0123737 | A1 | 5/2010 | Williamson et al. |
| 2011/0016376 | A1 | 1/2011 | Hinson |
| 2011/0210985 | A1 * | 9/2011 | Zipnick .......................... 345/660 |
| 2012/0133639 | A1 | 5/2012 | Kopf et al. |
| 2013/0100162 | A1 * | 4/2013 | Iseri .............................. 345/660 |

FOREIGN PATENT DOCUMENTS

WO    2007056449 A2    5/2007

OTHER PUBLICATIONS

International Search Report, mailed Feb. 13, 2014, Int. Appln. No. PCT/US2013/066974, 11 pp.
Dube, "5 Cool Things You Can Do With Bing Maps Aerial View," Jan. 28, 2011, Retrieved on: Oct. 12, 2012, 10 pp., Available at: http://www.makeuseof.com/tag/5-cool-bing-maps-aerial-view.

(Continued)

*Primary Examiner* — Ryan R Yang
(74) *Attorney, Agent, or Firm* — Dave Ream; Jim Ross; Micky Minhas (57) ABSTRACT

Systems, methods, and computer-readable storage media for providing images having zoomspots are provided. In embodiments, an interactive image is provided. Such an interactive image includes a zoomspot that, if selected, results in a magnified portion of the interactive image corresponding with the zoomspot. Subsequently, an indication of a selection of the zoomspot is received. In response thereto, the magnified portion of the interactive image corresponding with the zoomspot is automatically presented. The magnified portion can be presented in accordance with a predetermined location of the interactive image and a predetermined quality.

20 Claims, 7 Drawing Sheets

(56) References Cited

OTHER PUBLICATIONS

Doyle, "Bing vs Google—The Showdown of the Maps—A Student Perspective," HilaryPike, Mar. 16, 2010, Retrieved on: Oct. 12, 2012, 17 pp., Available at: http://blogs.msdn.com/b/springboard/archive/2010/03/17/bing-vs-google-the-showdown-of-the-maps-a-student-perspective.aspx.

"Street View Service," Retrieved on: Oct. 12, 2012, 14 pp., Available at: https://developers.google.com/maps/documentation/javascript/streetview.

* cited by examiner

PROVIDING IMAGES WITH ZOOMSPOTS

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the BING search engine provided by Microsoft Corporation of Redmond, Wash. Generally, such search utility home page background images are static images that may be visually appealing to the user but offer little else in terms of an immersive experience or to encourage attachment of the user with the search utility.

In some cases, panoramas and other high-resolution images (or collection of images) are used as a background image for the search engine home page. Such rich images often have details provided within the image that users are unable to view unless the user zooms into the image. One exemplary technology that may be utilized to achieve this functionality is the DeepZoom/SeaDragon technology owned by Microsoft Corporation of Redmond, Wash. and currently used within the PHOTOSYNTH branded services and applications. In such cases that background images offer rich content, the user is required to manually zoom into various aspects of the image to identify any interesting details or experiences within the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, providing images having zoomspots. Providing an image, such as a background image on a search engine home page, with at least one zoomspot enables a user to interact with the image. In this regard, a user may select a zoomspot to view a portion of the image scaled to focus on the particular portion of the image. As such, upon selection of a zoomspot, a magnified portion of the image that corresponds with the zoomspot is presented thereby enabling a user to view interesting details or experiences within the image that correspond with the zoomspot. In embodiments, the magnified portion of the image can be presented in accordance with a designated location, depth level (e.g., quality of the image), and/or animation path to arrive at the magnified portion.

BRIEF DESCRIPTION OF THE DRAWINGS

The present invention is illustrated by way of example and not limited in the accompanying figures in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, providing an image with one or more zoomspots. Such an interactive image having one or more zoomspots enables a user to interact with the image. In this regard, a user may select a zoomspot to view a portion of the image scaled to focus on the particular portion of the image. As such, upon selection of a zoomspot, a magnified portion of the image that corresponds with the zoomspot is presented thereby enabling a user to view interesting details or experiences within the image that correspond with the zoomspot. In one embodiment, the magnified portion of the image can be presented in accordance with a designated location, depth level (e.g., quality of the image), and/or animation path to arrive at the magnified portion.

Accordingly, one embodiment of the present invention is directed to one or more computer-readable storage media storing computer-useable instructions that, when used by one or more computing devices, cause the one or more computing devices to perform a method for providing images having zoomspots. The method includes receiving a request for presentation of a search engine home page on a display. An image is transmitted for presentation on the display. The image includes a zoomspot that, if selected, results in a magnified view of a portion of the image that corresponds with the selected zoomspot. A zoom location and zoom depth are also transmitted. A zoom location indicates the portion of the image to magnify, and a zoom depth indicating an extent of depth of the portion of the image to magnify. The magnified view of the portion of the image that corresponds with the selected zoomspot can be automatically displayed in accordance with the zoom location and the zoom depth in response to a selection of the zoomspot.

Another embodiment of the present invention is directed to a system for providing images having zoomspots. The system includes a content provider associated with one or more processors and one or more computer-readable storage media.

The system further includes a data store coupled with the content provider. Such a content provider is configured to receive a request for presentation of an image; transmit an image for presentation on a display, the image including a zoomspot that, if selected, results in automatic display of a zoomed in portion of the image corresponding with the zoomspot; transmit one or more zoom attributes that indicate the zoomed in portion of the image corresponding with the zoomspot or the manner in which to arrive at the zoomed in portion of the image; receive an indication of a selection of the zoomspot; and transmit a plurality of additional image portions associated with the zoomed in portion of the image for presentation in association with the zoomed in portion of the image.

In yet another embodiment, the present invention is directed to one or more computer-readable storage media storing computer-useable instructions that, when used by one or more computing devices, cause the one or more computing devices to perform a method for providing images having zoomspots. The method includes providing an interactive image having a zoomspot that, if selected, results in a magnified portion of the interactive image corresponding with the zoomspot. An indication of a selection of the zoomspot is received. The magnified portion of the interactive image corresponding with the zoomspot is automatically presented. Such a magnified portion is presented in accordance with a predetermined location of the interactive image and a predetermined quality.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
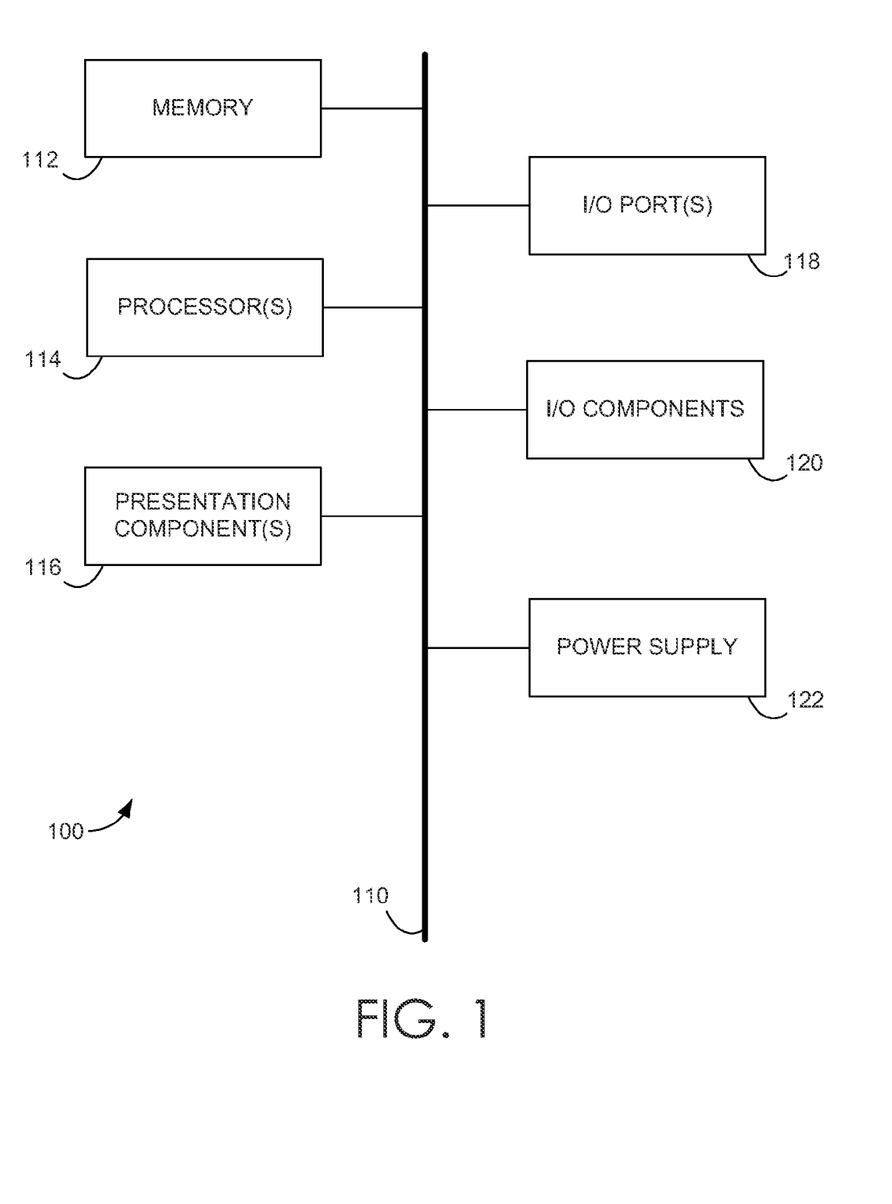
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention relate to systems, methods, and computer-readable storage media for, among other things, providing images with zoomspots. A zoomspot enables a user to view a magnified portion of an image (i.e., a target image) having a predetermined zoom location, zoom depth, and/or zoom path by selecting a predefined zoomspot within the initial image. In this regard, a user can select a zoomspot associated with a particular location of an image to view an enlarged version of the area within the image that corresponds with the zoomspot.

In implementation, upon receiving a request for presentation of an image, an image is transmitted for presentation, for example, within a search engine home page. A zoomspot indicator that indicates a zoomspot within the image is presented in association with the image. Upon presentation of the image having at least one zoomspot, interactions with the image are enabled, such as, for example, selection of a zoomspot, or portion thereof, provided within the image. As such, a user can select a zoomspot and, thereafter, be presented with a zoomed in view corresponding with the zoomspot, or indicator thereof. Such a zoomed in view can be accomplished using a predetermined zoom location, zoom depth, and/or zoom path associated with the selected zoomspot.

Figure 2:
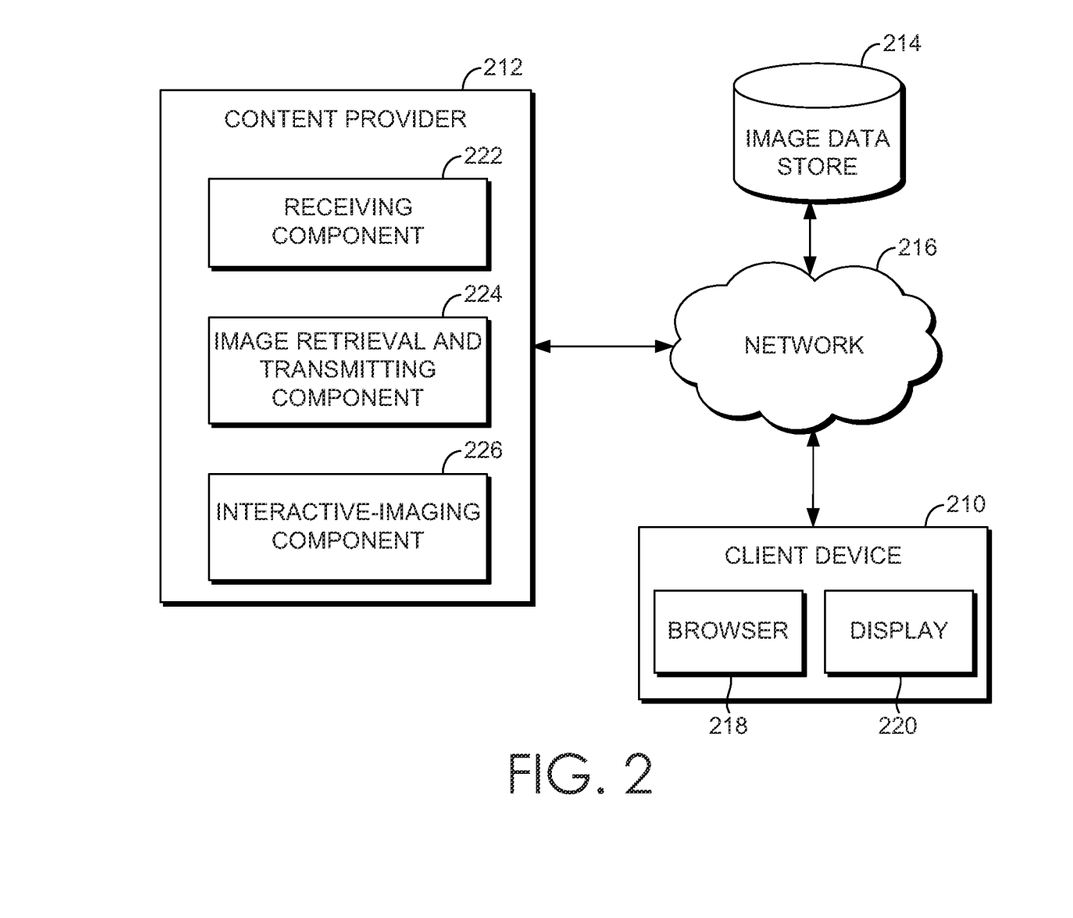
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which interactive images are enabled. An interactive image refers to an image having one or more zoomspots. A zoomspot, as used herein, refers to an area or portion of an image that, if selected, results in display of a target image corresponding with the zoomspot. A target image, as used herein, refers to an enlarged, magnified, or zoomed in representation of a zoomspot. In this regard, a target image provides a magnified view corresponding with the zoomspot. In some embodiments, the target image corresponds precisely with the zoomspot. For example, the size and shape of the target image are a proportionately enlarged version of the zoomspot size and shape. In other embodiments, the target image corresponds with the zoomspot in that there is a substantial overlap in the portion of the image associated with the zoomspot and the target image. In such an embodiment, the relative size and/or shape of the target image may not exactly match that of the zoomspot. For example, the zoomspot may be an area that is square in shape, while the target image may be a rectangular shape.

By providing an image having one or more zoomspots, or an interactive image, a user is able to automatically zoom into an experience within an image upon providing a single indication (e.g., selecting a zoomspot). For example, a single-click launch provides a user with a predetermined magnified view of a portion of an initially presented image. As will be described in further detail below, embodiments of the present invention provide systems and methods for providing an image with a zoomspot(s) with which a user can interact. In this way, upon selection of a zoomspot, the user receives a seamless transition from the initial image displayed to an enlarged portion of the initially presented image that corresponds with the selected zoomspot.

In some embodiments, such an interactive image is provided within a search engine home page (or another web page) to provide a user with an immersive experience at the search engine home page (or other web page). It should be noted that while the phrase "search engine home page" is used herein, the functionality described is equally applicable to any online landing page. Although an interactive image is generally described herein in relation to a search engine home page or a webpage, such an implementation is not intended to limit the scope of this invention. For example, in other embodiments, an interactive image can be provided within an application running on a client computing device. In some cases, such an application may have access to a remote content provider that provides content over a network, such as content provider 212. In other cases, such an application may run solely on a client computing device, that is, without any access to a remote content provider. In such an implementation, some or all of the functionality described in relation to content provider 212 may be employed or performed by the client computing device running the application. Any and all such variations, and any combination thereof, are contemplated to be within the scope of embodiments of the present invention.

Among other components not shown, the computing system 200 generally includes a client device 210, a content provider 212, and an image data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client devices, content providers, and image data stores may be employed in the computing system 200 within the scope of embodiments of the present invention. Each may comprise a single device/interface or multiple devices/interfaces cooperating in a distributed environment. For instance, the content provider 212 may comprise multiple devices and/or modules arranged in a distributed environment that collectively provide the functionality of the content provider 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the content provider 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of content providers and/or user computing devices. By way of example only, the content provider 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218 is configured to render a web page, such as a search engine home page, having an interactive image as at least a portion of the webpage (e.g., a background image) in association with the display 220 of the client computing device 210. As previously described, the interactive image includes one or more zoomspots that, if selected, result in an automatic presentation of a target image providing a magnified view of a portion of the initial image corresponding with the zoomspot. That is, upon selection of a zoomspot, or a portion thereof, a target image that is an enlarged view of at least a portion of the image corresponding with the zoomspot is automatically presented.

In operation, to render a web page having an interactive image, the browser 218 can receive an image (also referred to as image data). In embodiments, such an image or image data can be provided by a content provider, such as content provider 212 of FIG. 2 described in more detail below. A content provider may provide such an image, for example, upon receiving a request for a web page, such as a search engine home page, upon receiving a request to view an image (e.g., selection of an image link), or the like. For example, assume a user provides an indication to view a search engine home page (e.g., inputs a URL, web address, IP address of the search engine home page or selects a link associated with a search engine home page). In this way, in association with receiving data associated with a search engine home page, such as the search box, a background image for display within the search engine home page can also be received.

The received image may be in any of a number of formats. In some embodiments, an image may be a panoramic image, a high-resolution image (e.g., large pixel quality), a photosynth image, a flat image, a collection of images, or a combination thereof. In other embodiments, an image may be a low-resolution image. In such an embodiment, a high-resolution image may be used to identify a zoomspot(s) and to generate a corresponding target image(s) (i.e., zoomed in portion of the image), but the low-resolution image may be initially provided to the user in order to efficiently render the image.

In addition to receiving an image, the browser 218 can also receive zoomspot data and/or zoomspot indicator data. Zoomspot data indicates or describes a zoomspot location or position within an image. In one embodiment, zoomspot data indicates an area, location, or position of a zoomspot. Such an area or location can be described for example, using coordinates of the zoomspot (e.g., relative or absolute coordinates), indicating pixels associated with the zoomspot, etc. For instance, zoomspot data may include a specific set of coordinates or pixels corresponding with a zoomspot. By designating a location or area associated with a zoomspot, a user's interaction with such an area can be detected to result in a zoomed in experience associated with the zoomspot.

To enable a user to easily recognize a location of a zoomspot, a zoomspot indicator can be presented in association with an image to provide an indication of a zoomspot. A zoomspot indicator can be any indication, such as a visual indication, of a location of a zoomspot within an image. In one embodiment, a zoomspot indicator provides visual boundaries of a zoomspot, that is, a zoomspot indicator visually outlines a zoomspot. Other visual examples of a zoomspot indicator include, but are not limited to, a highlighted area; a shaded area; an area having a transparency different from other portions of the image; an area varied in color; an indication within a bounded area, such as a plus symbol, magnifying glass icon, or other symbol; etc. By way of another example, a zoomspot indicator may include text or audio describing a location of a zoomspot. For example, a zoomspot indicator may describe that a zoomspot is located in the vicinity of a window, an island, or another item within the image.

Zoomspot indicators can be provided within an image or overlay an image in any number of ways. In some embodiments, an image received from a content provider may include an embedded zoomspot indicator indicating a location of a zoomspot. For example, the content provider, or another component, may incorporate a zoomspot indicator within an image. In other embodiments, zoomspot indicator data describing a zoomspot indicator can be received, for example, from a content provider. For instance, zoomspot indicator data can be provided from a content provider in connection with providing the image. Zoomspot indicator data may be any data that indicates or describes a zoomspot indicator. By way of example only, and without limitation, such zoomspot indicator data may indicate coordinates of a zoomspot indicator (e.g., absolute or relative coordinates), pixels associated with a zoomspot indicator, style of a zoomspot indicator (e.g., color or area, transparency of area, border color, border thickness, etc.), size and/or shape of a zoomspot indicator, or the like. Zoomspot indicator data that indicates a location of a zoomspot indicator (e.g., set of coordinates) enable a zoomspot indicator to be placed at such a location within the image when the image is loaded and displayed. In some embodiments, a zoomspot indicator may be displayed in association with landing on a web page or upon an occurrence of an event after the user lands on the web page (e.g., move mouse).

In embodiments, zoomspots and/or zoomspot indicators are anchored to pixel coordinates in the interactive image, meaning that panning and manually zooming within the image will move the visual location of those zoomspots and/or zoomspot indicators as well. This allows a zoomspot, or indication thereof, that is located over an item in an image, for instance, to always hover over that item, regardless of how the user moves through the interactive image. This also means that the zoomspot indicator may not appear onscreen at all if the currently viewed portion of that image does not include the anchored pixels.

Upon receiving an image or image data, the browser 218 can render the image with a zoomspot indicator(s) in association with the display 220 of the client computing device 210. As previously described, in embodiments, the browser 218 utilizes zoomspot data and/or zoomspot indicator data in association with the image to render the image. The display 220 of the client computing device 210 displays the image having a zoomspot indicator(s). Such an image can be displayed upon or concurrent to rendering a web page, such as a search engine home page, that is to display the image.

In addition to browser 218 enabling user interaction with one or more web pages (e.g., receive user input of requests for various web pages including search engine home pages; receive user inputted search queries, generally inputted via a user interface presented on the display 220 and permitting alpha-numeric and/or textual input into a designated search box; etc.), browser 218 is further configured to enable user interaction with the image, such as a zoomspot associated with the image. For example, the browser 218 might receive user interactions with an initial image and/or a target image, such as, for example, selection of a zoomspot, deselection of a zoomspot, selection to manipulate the initial image (e.g. pan, manual zoom), selection to manipulate the target image (e.g., pan, manual zoom), etc.

In this regard, upon presenting an image having one or more zoomspots, for example, identified by a zoomspot indicator(s), a user may provide an indication to select a zoomspot, or a portion thereof. Selecting a zoomspot may occur in any number of ways. For example, a selecting device, such as a mouse or other selector, may be used to position a selector (e.g., a cursor) over a zoomspot followed by a selection of a button to indicate selection of such a zoomspot. In another example, a zoomspot may be selected by hovering a cursor or other selector over a zoomspot or zoomspot indicator, for example, for a predetermined amount of time. In other embodiments having a touch-screen display, a user digit, such as a finger, or a stylus may be used to initiate contact with an area on a display screen corresponding with a zoomspot. In some cases, to detect interaction with a zoomspot, a comparison of the user-selected location to the location of the zoomspot (as provided by the zoomspot data) may be performed. In this regard, a determination can be made that a selected portion of an image falls within the area defined or designated as a zoomspot.

Upon identifying a selection of a zoomspot, a target image corresponding with the zoomspot can be rendered via the browser 218 and presented on the display 220. As previously described, a target image refers to an enlarged, magnified, or zoomed in representation of a zoomspot. In this regard, a target image provides a magnified view corresponding with the zoomspot. In some embodiments, the target image at least substantially overlaps the area defined as the zoomspot and/or the zoomspot indicator. Although described herein as an image, a target image may be a collection of images and can be any number of formats, such as a panoramic, a high-resolution image(s), a low-resolution image(s), a photosynth image, a flat image, a combination thereof, or the like.

As can be appreciated, a target image can be of a number of various forms. In one embodiment, a target image is an entirely different image from the initially displayed image. In this regard, a separate image that is an enlarged portion of the original image is provided as a target image (e.g., downloaded and displayed). For instance, a larger resolution file can be downloaded and presented immediately upon user selection of a zoomspot. In another embodiment, a target image is an enlarged or magnified portion of the original image. In this way, the target image is a particular focus of a portion of the original image that is already fully downloaded and displayed. For example, a target image might be a modified scale of the viewed area of the initial image such that a particular area of the image is zoomed into. In yet another embodiment, a target image might be a combination of the original image and additional image data. For instance, a target image might be a specific focus on the initial image that is already fully downloaded as well as include target image data from a progressive download to supplement the original image (e.g., to enhance quality of the zoomed in portion). By way of example, in cases that an initial image is a high-quality image (e.g., a high resolution image or collection of images), a target image can be scaled to focus on a particular portion of the initial image corresponding with a selected zoomspot as well as incorporate additional target image data (e.g., at higher resolution) that aligns with the focused portion to increase quality of the target image thereby allowing for more zoom levels.

The target image can be presented in any manner or implementation. In one implementation, upon receiving a selection of a zoomspot, a corresponding target image can be presented in accordance with zoom attributes, for example, received from a content provider. For instance, in some embodiments, a content provider can provide zoom attributes simultaneous or substantially simultaneous with providing the original image, zoomspot data, and/or zoomspot indicator data. Thereafter, in accordance with a selection of a zoomspot, the zoom attributes can be referenced and used to present the corresponding target image. In another implementation, upon receiving a selection of a zoomspot, the browser can communicate with a content provider to obtain one or more zoom attributes such that the target image can be presented in accordance with such zoom attributes. For instance, an indication of a zoomspot selection can be provided to a content provider and, in response, the content provider can return one or more zoom attributes that indicate a target image to display that corresponds with the selected zoomspot.

A zoom attribute can be any attribute, detail, or data indicating or describing a target image. That is, a zoom attribute provides an indication of a resulting target image to display or the manner in which to display the target image upon selection of a corresponding zoomspot. As such, zoom attributes are associated with zooming into or magnifying a selected portion of the image (i.e., an area associated with a zoomspot). In embodiments, a zoom attribute may be a zoom location, a zoom depth, or a zoom path. A zoom location refers to a location within an image that is desired or intended to be magnified. A zoom location can be designated or identified in any number of ways, such as, for example, an indication of a coordinate or set of coordinates (e.g., relative or absolute), an indication of a set of pixels, etc. In embodiments, and as described more fully below, a zoom location is predetermined or preset for a particular zoomspot or target image, for instance, to ensure a desired or intended experience.

A zoom depth refers to a level or extent of depth of an image that is desired or intended. A zoom depth can be designated or identified in any number of ways, such as, for example, an indication of quality of image (e.g., ratio), etc. For example, in a high-quality image, the zoom depth may enable zooming to five levels. In embodiments, and as described more fully below, a zoom depth is predetermined or preset for a particular zoomspot or target image, for instance, to ensure a desired or intended experience.

A zoom path refers to a path to arrive at presentation of a target image (e.g., having a predefined zoom location and/or zoom depth). That is, a zoom path is the path of animation presented in association with a zoom experience. In one embodiment, a zoom path includes or highlights a set of coordinates along the path to a target image. A zoom path can be performed in any number of ways. In some cases, a zoom path might be designated as a linear regression zoom path. Such a zoom path zooms in to the prescribed zoom location maintaining the same area of the page. In other cases, a zoom path might be a center and zooming path that centers and zooms into the image to the prescribed zoom location. In yet other cases, a zoom path may be customized to showcase other content within the image experience before arriving at the intended target image. For example, a zoom path may pan to the right to show an item not within the purview of the target image before zooming to the zoom location association with the target image. In embodiments, and as described more fully below, a zoom path is predefined, for instance, to complement the particular image and/or target image.

As can be appreciated, as a target image can be displayed in association with a zoom path, any number of intermediate images, or portions of the initial images, may be presented between an initial image and arriving at the target image corresponding with the zoomspot. Similar to a target image, an intermediate image can be of varying formats including, for example, a newly downloaded image, a focus of a previously downloaded image, a modified image having additional image data (e.g., via progressive downloading), or the like. Further, such intermediate images, or data associated therewith (i.e., intermediate image data describing, for instance, zoom depths, zoom locations, etc.) can be provided at the time of providing the initial image or upon a user selection of the zoomspot.

A target image is can be presented in any number of locations. For example, the target image can replace the location of the initial image (e.g., size and/or location). In another example, a target image might overlay the initial image (e.g., at least partially overlap the initial image). These are only examples, and a location at which a target image is presented is not intended to limit the scope of embodiments of the present invention.

Upon presenting a target image, such as via display 220 of client computing device 210, a user can view details or interesting content associated with the zoomspot that the user may otherwise be unable to view in the original image (at least with the same level of detail). As such, a user is presented with a zoomed in version of the initial image experience that corresponds with the zoomspot, or indication thereof. In some embodiments, in association with presenting a target image, the zoomspot indicator can be modified or removed. For example, in some cases, the zoomspot indicator can be modified to become a zoom-out indicator. Such a zoom-out indicator can be presented within the target image and provide an indication that, if selected, zooms out the image for example, to the initial image. That is, selection of a zoom-out indicator can resume to the original image displayed prior to selecting a zoom indicator.

It should be noted that the functionality described herein as being performed by the browser 218 may be performed by any other application capable of rendering Web content. Any and all such variations, and any combination thereof, are contemplated to be within the scope of embodiments of the present invention. Further, as previously described, the functionality described herein as being performed by the browser 218 may be performed, or partially performed, by an application running on a client computing device.

The content provider 212 is configured to receive and respond to requests that it receives from components associated with client computing devices, for instance, the browser 218 associated with the client computing device 210. In embodiments, the content provider 212 is a search engine. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the content provider 212 includes a receiving component 222, an image retrieval and transmitting component 224, and an interactive-imaging component 226. The illustrated content provider 212 also has access to an image data store 214. The image data store 214 is configured to store image data, that is, images and/or information associated with images. In various embodiments, such information may include, without limitation, raw image data, optimized image data, image data portions (e.g., image tiles, as more fully described below), zoomspot data, zoomspot indicator data, zoom attributes, target images, intermediate images, and the like. In embodiments, the image data store 214 is configured to be searchable for one or more of the items stored in association therewith. It will be understood and appreciated by those of ordinary skill in the art that the information stored in association with the image data store 214 may be configurable and may include any information relevant to images configured for presentation (e.g., on a search engine home page). The content and volume of such information are not intended to limit the scope of embodiments of the present invention in any way. Further, though illustrated as a single, independent component, the image data store 214 may, in fact, be a plurality of storage devices, for instance a database cluster, portions of which may reside in association with the content provider 212, the client computing device 210, another external computing device (not shown), and/or any combination thereof.

The receiving component 222 of the content provider 212 is configured to receive requests for presentation of images (e.g., interactive images). Typically, such a request is received via a browser associated with a client computing device, for instance, the browser 218 associated with the client computing device 210. Such a request may be explicit or inherent. For example, an image request may be received upon receiving a request for a web page, such as a search engine home page, upon receiving a request to view an image (e.g., selection of an image link), or the like. For instance, assume a user provides an indication to view a search engine home page (e.g., inputs a URL, web address, IP address of the search engine home page or selects a link associated with a search engine home page). In such a case, an indication to view an image can be received.

Upon receiving a request for presentation of an image (e.g., explicitly or inherently), the image retrieval and transmitting component 224 is configured to reference an image(s) or image data (e.g., from the image data store 214) and transmit such data for presentation, for example, to a browser associated with a client computing device. For instance, such image data may be presented as at least a portion of the background of a search engine home page.

Images or image data stored in association with the image data store 214 may take any of a number of different forms. For example, an image may be in any of a number of formats. In embodiments, an image may be a panoramic image, a high-resolution image (e.g., large pixel quality), a low-resolution image, a photosynth image, a flat image, a collection of images, or a combination thereof. For instance, such image data may be a single image or multiple images placed together such that the result appears to be a contiguous single image. Additionally, such image data may be in the form of a panorama or another explorable photo image (e.g., a synth). As utilized herein, the term "panorama" refers to a wide-angle view or representation of an image such that it appears to a person viewing the larger image that s/he is standing in one location and viewing toward different directions from a single vantage point. As utilized herein, the term "synth" refers to image data that is collectively assembled and presented such that it appears as though the viewer was looking at the same object from a variety of different directions or vantage points. In some embodiments of the present invention, the image data is broke down into image data portions or tiles such that the data may be processed in smaller chunks that contain less information. Such permits faster and more efficient image data processing. Accordingly, the image data store 214 is further configured to store image data portions or tiles.

In addition to providing an image (e.g., image data), the image retrieval and transmitting component 224 can also provide zoomspot data and/or zoomspot indicator data. In one embodiment, zoomspot data indicates an area, location, or position of a zoomspot within an image, for example, using coordinates of the zoomspot (e.g., relative or absolute coordinates), indicating pixels associated with the zoomspot, etc. By designating the location or area associated with a zoomspot, a user's interaction with such an area can be detected to result in a zoomed in experience associated with the zoomspot. Zoomspot indicator data enables a user to easily recognize a location of a zoomspot. A zoomspot indicator can be any indication, such as a visual indication, of a location of a zoomspot within an image, for example, designated by coordinates of a zoomspot indicator. In other embodiments, the image provided by a content provider may include an embedded zoomspot indicator within the image.

As such, the image retrieval and transmitting component 224 can be configured to reference such zoomspot data and/or zoomspot indicator data (e.g., from the image data store 214) and transmit such data for presentation, for example, to a browser associated with a client computing device. Zoomspot data and/or zoomspot indicator data may be stored in association with the corresponding image(s) in image data store 214. As can be appreciated, such data may take any of a number of different forms.

Zoomspot data and/or zoomspot indicator data can be defined or designated in any manner. In one embodiment, zoomspot data and/or zoomspot indicator data can be defined by a user or editor that views an image and selects a location for a zoomspot and/or zoomspot indicator. In another embodiment, zoomspot data and/or zoomspot indicator data can be automatically generated. For instance, assume a user views a magnified portion of an image and designated such an area as preferred zoomspot. Such a zoomspot location and corresponding zoomspot indicator can then be automatically identified and captured in association with the image. By way of another example, assume a user indicates a portion of an image as a preferred zoomspot. In such a case, an optimal depth level and/or zoom location for a target image can be automatically identified. In yet another example, a zoom path can be user selected or automatically determined, for example, based on aspects of the image, or the like.

Interactive-imaging component 226 is configured to facilitate providing interactive images. In this regard, a portion of an image can be automatically zoomed into or magnified upon a selection of a corresponding zoomspot. Interactive images can be interacted with in any number of ways. By way of example, the browser 218 might receive user interactions with an initial image and/or a target image, such as, for example, selection of a zoomspot, deselection of a zoomspot, selection to manipulate the initial image (e.g. pan), selection to manipulate the target image (e.g., pan), etc.

In embodiments, the interactive-imaging component 226 provides target image data and/or zoom attributes corresponding with the zoomspot. As previously described, target image (e.g., target image data) and/or zoom attributes (e.g., zoom location, zoom depth, and/or zoom path) can be provided to the browser 218 simultaneous with or nearly simultaneous with providing the initial image, zoomspot data, and/or zoomspot indicator data. In this regard, upon recognizing to provide an image, target image data and/or zoom attributes associated with the image can be referenced (e.g., from the image data store 214) and transmitted, for example, to a browser associated with a client computing device. In such an embodiment, when the browser receives an indication of a selection of a zoomspot, the received target image data and/or zoom attributes can be referenced and used to present the target image. Although described in relation to the interactive-imaging component 226, such functionality can be performed by any component, such as the image retrieval and transmitting component 224 of FIG. 2.

In other embodiments, upon identifying a selection of a particular zoomspot, target image data and/or zoom attributes corresponding with the zoomspot can be referenced (e.g., from the image data store 214) and provided, for example, to the browser 218 of the client computing device 210. As previously described, a target image refers to an enlarged, magnified, or zoomed in representation of a zoomspot. In this regard, a target image provides a magnified view corresponding with the zoomspot. As previously described, the target image may be an entirely new image that is separate from the initial image having the zoomspot. In such a case, the designated target image associated with the selected zoomspot can be provided to the client computing device 210.

In other embodiments, the target image may include at least a portion of the originally displayed image. That is, the target image may be a zoomed in view of the initial image (e.g., based on a scale change of the viewed area) to focus on a particular area associated with the selected zoomspot. In such embodiments, upon identifying a selection of a particular zoomspot, zoom attributes corresponding with the zoomspot can be referenced and provided, for example, to the browser 218 of the client computing device 210. In this regard, the zoom attributes can provide an indication of a zoom location, zoom depth, and zoom path, for example, to apply in relation to the image to arrive at the target image. Further, in some instances, additional target image data may be provided for inclusion with the initial image (e.g., complete progressive downloading). As such, additional target image data (e.g., image tiles) can be referenced (e.g., from the image data store 214) and provided for inclusion with the initial image or to overlay the initial image. By way of example only, the content provider may facilitate downloading a different form of image data (e.g., multi-resolution image data or "tiles") to display a higher resolution image(s) of the zoomed in portion of the initial image. One exemplary technology that may be utilized to achieve this functionality is the DeepZoom/SeaDragon technology owned by Microsoft Corporation of Redmond, Wash. and currently used within the PHOTOSYNTH branded services and applications.

As previously described, a zoom attribute can be any attribute, detail, or data indicating or describing a target image. That is, a zoom attribute provides an indication of a resulting target image to display or the manner in which to display the target image upon selection of a corresponding zoomspot. As such, zoom attributes are associated with zooming into or magnifying a selected portion of the image (i.e., an area associated with a zoomspot). In embodiments, a zoom attribute may be zoom location, a zoom depth, and a zoom path. A zoom location refers to a location of an image that is desired or intended to be magnified. A zoom location can be designated or identified in any number of ways, such as, for example, an indication of a coordinate or set of coordinates (e.g., relative or absolute), an indication of a set of pixels, etc. A zoom depth refers to a level or extent of depth of an image that is desired or intended. A zoom depth can be designated or identified in any number of ways, such as, for example, an indication of quality of image (e.g., ratio), etc. A zoom path refers to a path to arrive at presentation of a target image (e.g., having a predefined zoom location and/or zoom depth). That is, a zoom path is the path the animation takes to zoom in, such as a linear regression zoom path, a center and zooming path that centers and zooms into the image to the prescribed zoom location, or a customized path to showcase other content within the image experience before arriving at the intended target image. For example, a zoom path may pan to the right to show an item not within the target image before zooming to the zoom location association with the target image.

As can be appreciated, as a target image can be displayed in association with a zoom path, any number of intermediate images, or portions of the initial image, may be presented between an initial image and arriving at the target image corresponding with the zoomspot. Similar to a target image, an intermediate image can be a newly downloaded image or a changed scale of a viewed area of the original image, etc.

Further, such intermediate image data can be provided at the time of providing the initial image or upon a user selecting the zoomspot.

In embodiments, upon receiving an indication of a selection of a zoomspot, the interactive-imaging component 226 is configured to modify or remove the zoomspot indicator. In this regard, the interactive-imaging component 226 can initiate a modification of the zoomspot indicator to a zoom-out indicator. Accordingly, the interactive-imaging component 226 may provide an indication to modify the zoomspot indicator to include an indication representative of a zoom-out indicator (such as a negative symbol (−), or the like). Such a zoom-out indicator can be presented within the target image and provide an indication that, if selected, zooms out the image, for instance, to the initial image. Further, a location, size, or other details for presenting a zoom-out indicator can also be identified and/or provided to the client computing device 210.

The interactive-imaging component 226 can, in some embodiments, facilitate additional interaction with an interactive image and/or target image. In this regard, the interactive-imaging component 226 may recognize indications of user interactions such as manual zoom, panning, etc. and provide appropriate data, such as image data, used to render the modified image. For example, in embodiments, an image may be draggable to explore a cylindrical or spherical panorama that can be dragged up, down, left and right, to reveal additional information and may be manually zoomed (e.g., via a mouse wheel) in and out to reveal more or less of the information. In other embodiments, an image may "wrap around" so the user may go a full 30 degrees and end up where they started in the panorama.

Further, in one embodiment of the present invention, layers of interactive images can be provided. For example, a target image displayed upon selection of a zoomspot may have another zoomspot that, if selected, results in another level of zoom relative to the zoomspot within the target image. As such, the interactive-imaging component 226 can facilitate interactions with the various layers. For example, the interactive-imaging component 226 might maintain a record of the particular layer viewed and/or modifications made an image such that the user interface can be appropriately updated based on the current interactive image layer and/or a modification(s) made to an image(s).

Figure 3:
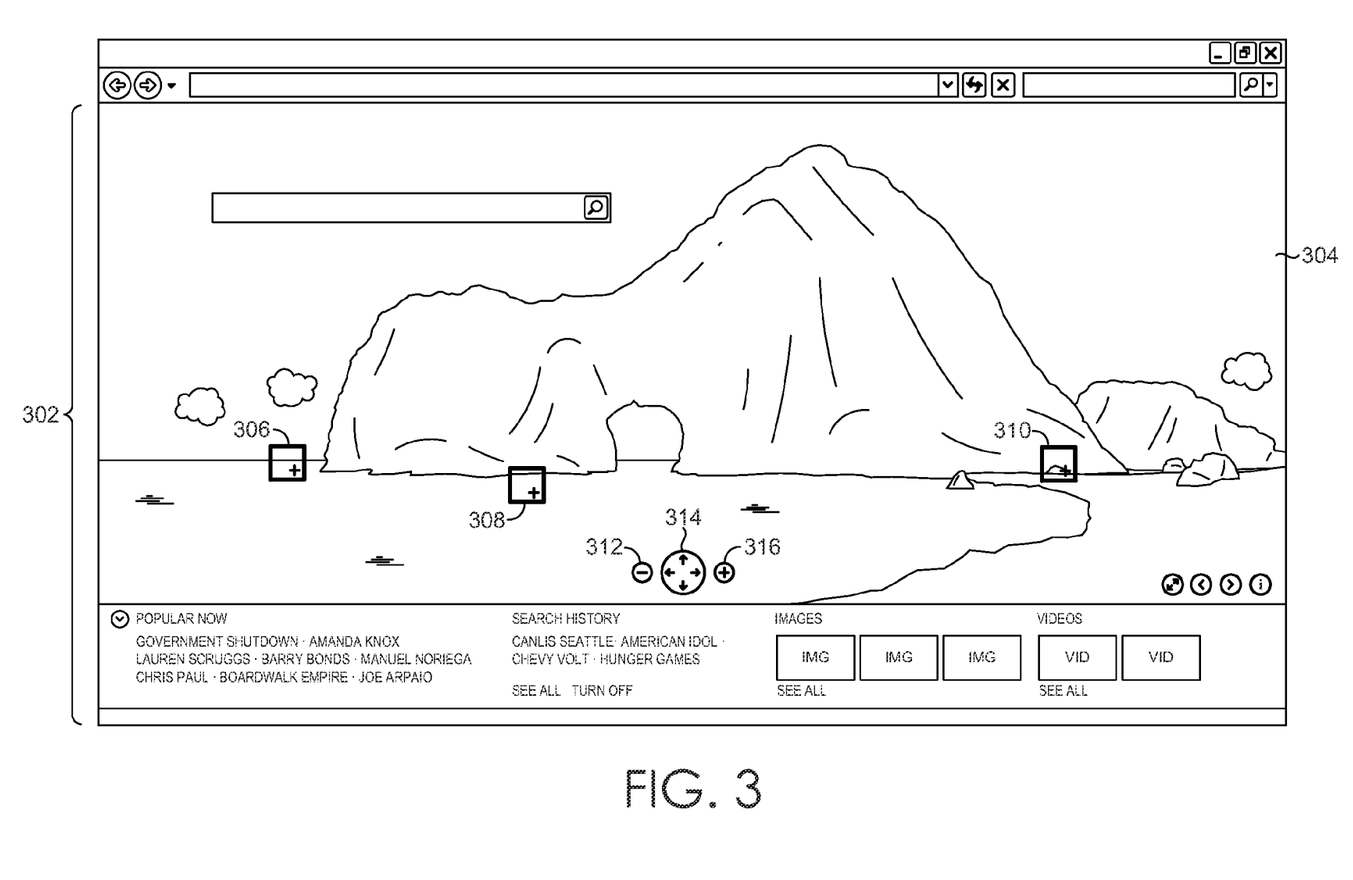
FIG. 3 is a schematic diagram showing an exemplary screen display of a search engine home page having an interactive background image, in accordance with an embodiment of the present invention.
Figure 4:
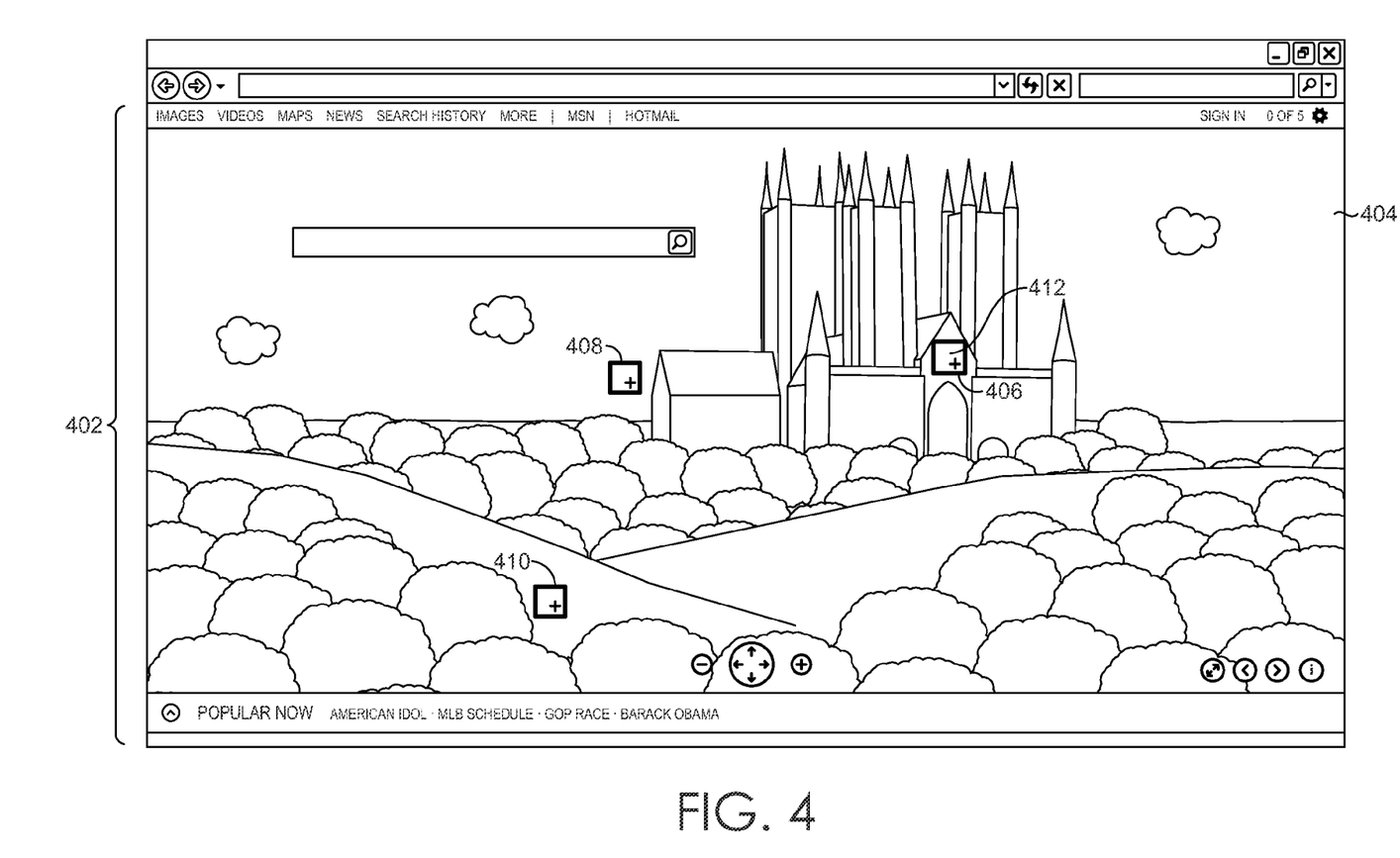
FIG. 4 is another schematic diagram showing an exemplary screen display of a search engine home page having an interactive background image, in accordance with an embodiment of the present invention.
Figure 5:
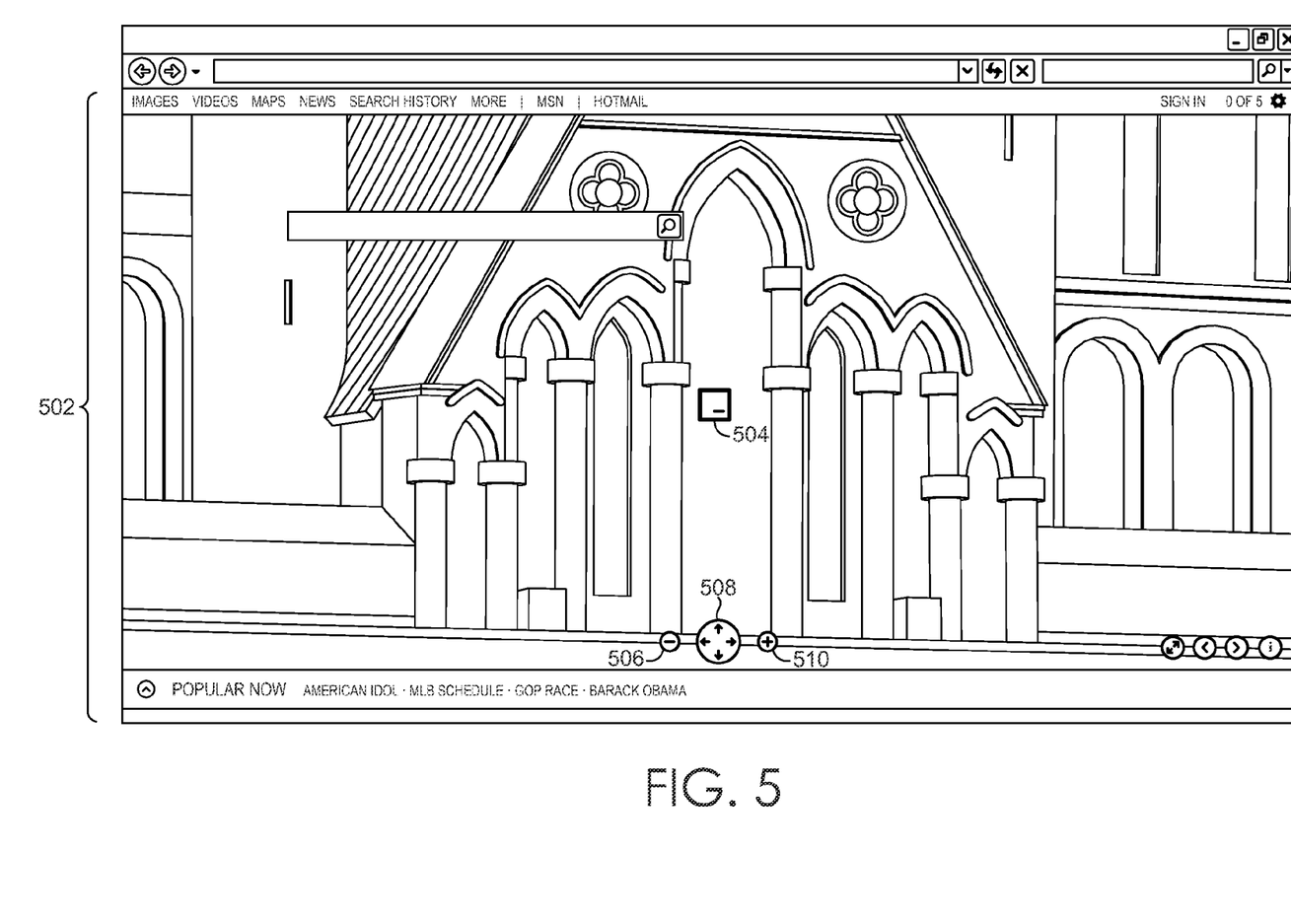
FIG. 5 is a schematic diagram showing an exemplary screen display of a zoomed in portion of an interactive background image, in accordance with an embodiment of the present invention.

By way of example, FIGS. 3-5 provide exemplary user interfaces illustrating user interaction with images. With initial reference to FIG. 3, a schematic diagram is illustrated showing an exemplary screen display of a search engine home page 302, in accordance with an embodiment of the present invention. The search engine home page 302 has an interactive background image 304 with a first zoomspot indicator 306, a second zoomspot indicator 308, and a third zoomspot indicator 310. Each of the zoomspot indicators 306, 308, and 310 outline or define the corresponding zoomspots that, if selected, result in a zoomed in experience associated with the zoomspot. The "+" symbols included within each of the zoomspot indicators 306, 308, and 310 can be used to provide an indication that selection therein results a zoom in experience. Such a symbol, or other symbol, text, or indicator, may help distinguish the zoomspot indicators from other types of indicators. As illustrated in FIG. 3, a user may also have an option to manually navigate the background image 304 using manual navigation icons 312, 314, and 316.

Turning to FIG. 4, a schematic diagram is illustrated showing an exemplary screen display of a search engine home page 402, in accordance with an embodiment of the present invention. The search engine home page 402 has an interactive background image 404 with a first zoomspot indicator 406, a second zoomspot indicator 408, and a third zoomspot indicator 410. The zoomspot indicators 406, 408, and 410 outline or define the corresponding zoomspot that, if selected, results in a zoomed in experience associated with the zoomspot.

For purposes of illustration, assume that a user places a cursor within the boundaries of the zoomspot indicator 406 and selects the zoomspot 412. With the single click or interaction, a zoomed in view corresponding with the zoomspot is automatically provided to the user, as illustrated at 502 of FIG. 5. As illustrated in FIGS. 4 and 5, and as described above in some embodiments, the magnified view 502 of FIG. 5 substantially overlaps the area defined by the zoomspot indicator 406 of FIG. 4, but does not exactly match the area defined by the zoomspot indicator 406 of FIG. 4.

As illustrated in FIG. 5, a zoomout indicator 504 is provided to enable a user to zoom out of the magnified view 502 of FIG. 5, for example, to return to the background image 404 of FIG. 4. The zoomout indicator 504 includes a "−" symbol to provide an indication that selection therein results in a zoom out experience. With continued reference to FIG. 5, a user may also have an option to manually navigate the magnified view 502 using manual navigation icons 506, 508, and 510. Further, although not illustrated, FIG. 5 could include a zoomspot indicator to allow the user to further zoom into a portion of the magnified view 502 of FIG. 5.

In embodiments, the magnified view 502 of FIG. 5 is presented in accordance with zoom attributes associated with the zoomspot 412. For instance, a zoomspot location indicating the area to magnify, a zoomspot depth indicating a quality of the image, and/or a zoom path at which to arrive at the magnified view 502 can be referenced and utilized to zoom from background image 404 of FIG. 4 to magnified view 502 of FIG. 5. As can be appreciated, zoom attributes can be received at the client computing device at any time, for example, when the background image 404 of FIG. 4 is provided to the client computing device or upon the selection of the zoomspot 412. Further, additional image tiles can be received and displayed to increase the resolution of the magnified view 502 of FIG. 5.

Figure 6:
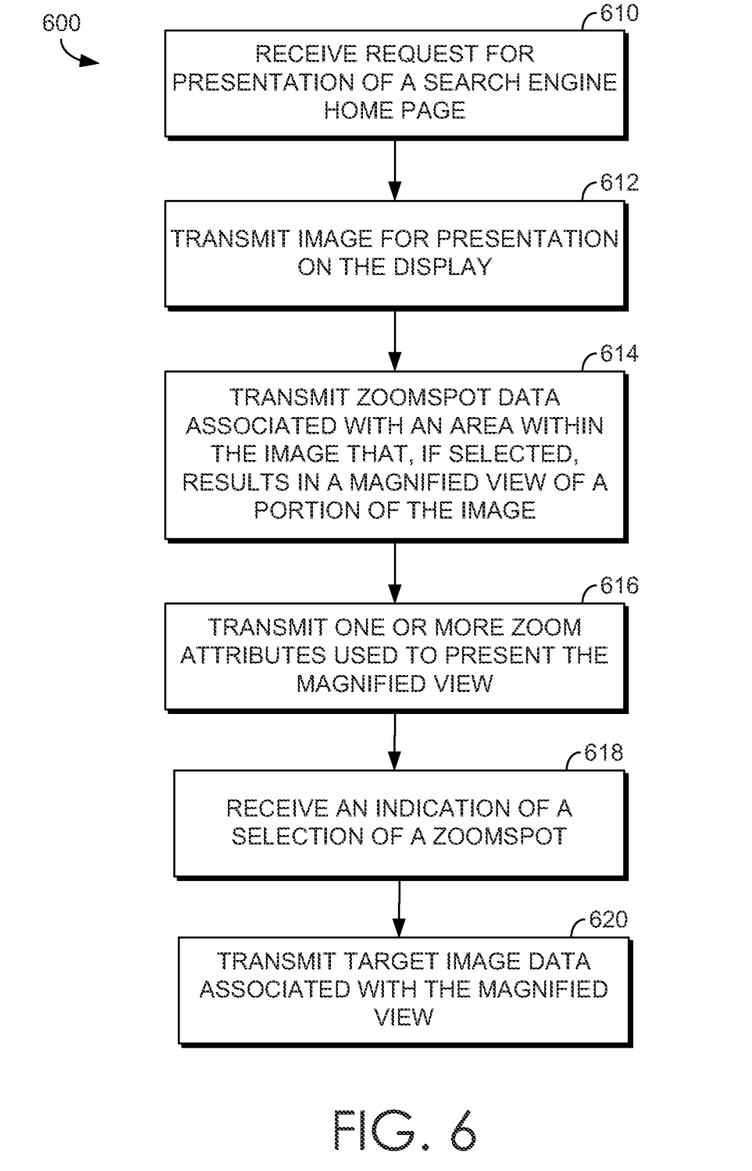
FIG. 6 is a flow diagram showing an exemplary method for providing images having zoomspots, in accordance with an embodiment of the present invention.

With reference to FIG. 6, a flow diagram is provided that illustrates an exemplary method 600 for enabling interactive images, in accordance with an embodiment of the present invention. Initially, as indicated at block 610, a request for presentation of a search engine home page on a display is received, for instance, from a browser associated with a client device (e.g., the client computing device 210 of FIG. 2). In response to receiving the request, an image is transmitted for presentation on the display associated with the requesting device (e.g., the display 220 of the computing device 210 of FIG. 2), as indicated at block 612. In some embodiments, the transmitted image is a high-resolution images or set of images. At block 614, zoomspot data is transmitted to the requesting device. Such zoomspot data indicates an area within the image that, if selected, results in a magnified view of a portion of the image corresponding with the zoomspot. Subsequently (or substantially simultaneously), at block 616, one or more zoom attributes are transmitted to the requesting device. A zoom attribute may be, for example, a zoom location at which to zoom into the image, a zoom depth indicating an extent of depth of a zoom of the image, or a zoom path indicating a path for presenting the magnified view (e.g., a series of coordinates). An indication of a selection of a zoomspot is received. This is indicated at block 618. Subsequently, at block 620, target image data associated with the magnified view of the portion of the image corresponding with the zoomspot are transmitted to the requesting device. By way of example, one or more image tiles can be referenced (e.g., from a data store) based on the selected zoomspot and, thereafter, provided for inclusion with the initial image. Such additional image tiles can facilitate display of a higher resolution image(s) of the magnified portion of the initial image. Although FIG. 6 illustrates transmitting zoom attributes prior to receiving an indication of a selection of a zoomspot, in some embodiments, zoom attributes can be transmitted upon receiving an indication of a selection of a zoomspot. In such an embodiment, upon selection of a zoomspot, zoom attributes corresponding with the zoomspot can be referenced and provided to the requesting device.

Figure 7:
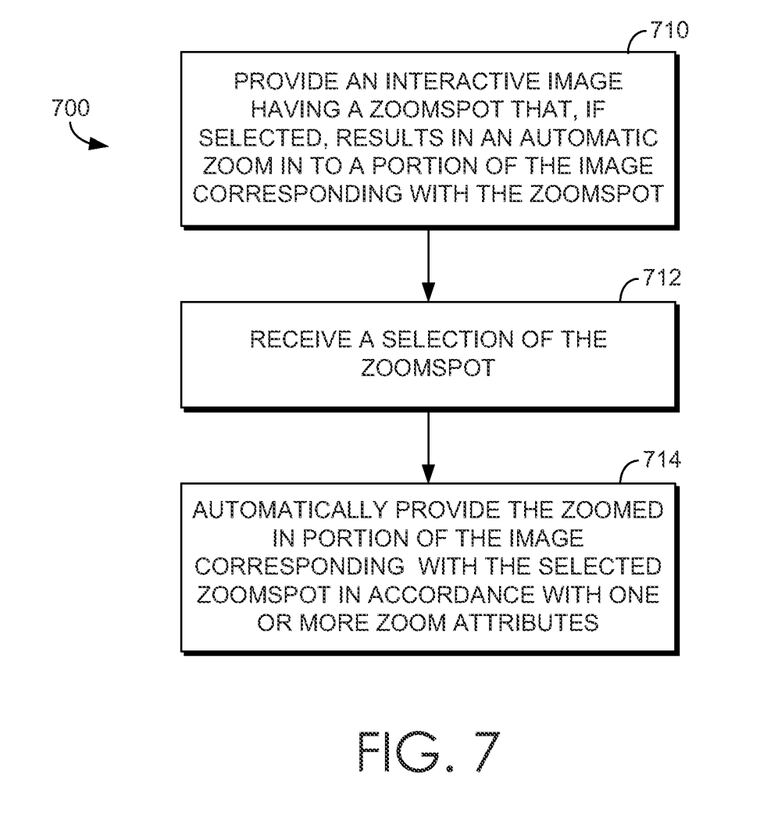
FIG. 7 is a flow diagram showing another exemplary method for providing images having zoomspots, in accordance with an embodiment of the present invention.

Turning now to FIG. 7, a flow diagram is illustrated showing another exemplary method 700 for enabling interactive images, in accordance with an embodiment of the present invention. Initially, as indicated at block 710, an interactive image having a zoomspot is provided. A zoomspot refers to an area within the image that, if selected, results in an automatic zoom in to a portion of the image corresponding with the zoomspot. The zoomspot may be indicated as such using a zoomspot indicator, for example, that outlines the zoomspot. Subsequently, at block 712, a selection of the zoomspot is received. For example, a user may place a cursor over the zoomspot, as identified by a zoomspot indicator, and select the zoomspot. In response to the zoomspot selection, a zoomed in portion of the image corresponding with the zoomspot is automatically provided in accordance with one or more zoom attributes. This is indicated at block 714.

A zoom attribute may be, for example, a zoom location at which to zoom into the image, a zoom depth indicating an extent of depth of a zoom of the image, or a zoom path indicating a path for presenting the magnified view (e.g., a series of coordinates). In this regard, one or more zoom attributes might be received, for instance, from a content provider at the time of providing the initial image or upon receiving an indication of a selection of a zoomspot. In addition, in some embodiments, the zoomed in portion may also be provided or enhanced upon receiving image data associated with the zoomed in portion of the image corresponding with the zoomspot. By way of example, one or more image tiles can be received and used to provide or enhance the zoomed in portion of the image corresponding with the selected zoomspot. Such additional image tiles can facilitate display of a higher resolution image(s) of the zoomed in portion of the initial image.

As can be understood, embodiments of the present invention provide systems and methods for enabling interactive images having zoomspots. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 600 of FIG. 6 and the method 700 of FIG. 7 are not meant to limit the scope of the present invention in any way and, in fact, the steps may occur in a variety of different sequences within embodiments hereof By way of example, step 620 of FIG. 6 is not required in various embodiments. Any and all such variations, and any combination thereof, are contemplated to be within the scope of embodiments of the present invention.

What is claimed is:

1. A method for providing images having zoomspots, the method comprising:
   receiving a request for presentation of a search engine home page on a display;
   transmitting an initial background image for presentation on the search engine home page on the display, the initial background image including prior to user selection, one or more predefined zoomspots that, if selected, results in a magnified view of a portion of the initial background image that corresponds with the selected zoomspot, as defined by a zoomspot indicator;
   receiving a user selection of one of the one or more predefined zoomspots of the initial background image displayed on the search engine home page;
   transmitting a predetermined zoom location indicating a portion of the initial background image to magnify and a predetermined zoom depth indicating an extent of depth of the portion of the initial background image to magnify; and
   automatically displaying a magnified view of the portion of the initial background image that corresponds with the selected zoomspot in accordance with the predefined zoom location and the predefined zoom depth.

2. The method of claim 1 further comprising transmitting a predetermined zoom path of animation indicating a path to arrive at the magnified view of the portion of the initial background image that corresponds with the selected zoomspot.

3. The method of claim 1 further comprising:
   in response to the indication of the user selection of one of the one or more predefined zoomspots, transmitting target image data for inclusion with the magnified view of the portion of the initial background image that corresponds with the selected zoomspot.

4. The method of claim 1 further comprising transmitting zoomspot data that indicates a location of the predefined zoomspot within the initial background image.

5. The method of claim 1, wherein the predetermined zoom location and the predetermined zoom depth are transmitted substantially simultaneous with transmitting the initial background image for presentation on the display.

6. The method of claim 1, wherein the predetermined zoom location and the predetermined zoom depth are transmitted upon receiving an indication of a user selection of one of the one or more predefined zoomspots.

7. The method of claim 1, wherein the predetermined zoom depth and the predetermined zoom location are defined based on a user or editor evaluating the initial background image to identify an interesting aspect of the image, which is indicated by a zoomspot indicator.

8. The method of claim 7, wherein the predetermined zoom depth and the predetermined zoom location are specific to the zoomspot such that another zoomspot is associated with a different zoom depth and zoom location.

9. A system for providing images having zoomspots, the system comprising:
   a content provider associated with one or more processors and one or more computer-readable storage media; and
   a data store coupled with the content provider,
   wherein the content provider:
   (1) receives a request for presentation of an initial image;
   (2) transmits the initial image for presentation on a search engine home page of a display, the initial image including a zoomspot prior to user selection that, if selected, results in automatic display of a zoomed in portion of the image corresponding with the zoomspot, as defined by a zoomspot indicator;

(3) transmits one or more predetermined zoom attributes that indicate the zoomed in portion of the initial image corresponding with the zoomspot or the manner in which to arrive at the zoomed in portion of the initial image;

(4) receives an indication of a user selection of the zoomspot; and (5) transmits a plurality of image portions associated with the zoomed in portion of the initial image for automatic presentation on the search engine home page in association with the zoomed in portion of the initial image.

10. The system of claim 9, wherein the one or more predetermined zoom attributes comprise at least one zoom location that indicates a location within the initial image that is intended to be magnified.

11. The system of claim 9, wherein the one or more predetermined zoom attributes comprise at least one zoom depth that indicates an extent to which zoom the initial image is to be magnified.

12. The system of claim 9, wherein the one or more predetermined zoom attributes comprise at least one zoom path that indicates a set of coordinates to traverse with animation to arrive at the zoomed in portion of the image.

13. The system of claim 9, wherein upon receiving the indication of the user selection of the zoomspot, referencing the plurality of image portions associated with the zoomed in portion of the initial image.

14. The system of claim 9, wherein the one or more predetermined zoom attributes are referenced and transmitted upon receiving the indication of the user selection of the zoomspot.

15. One or more computer-readable storage media storing computer-useable instructions that, when used by one or more computing devices, cause the one or more computing devices to perform a method for providing images having zoomspots, the method comprising:

providing, on a search engine home page, an interactive image having a predefined zoomspot prior to user selection that, if selected, results in a magnified portion of the interactive image corresponding with the zoomspot, wherein the zoomspot is identified by a zoomspot indicator;

receiving an indication of a user selection of the predefined zoomspot of the interactive image on the search engine home page; and automatically presenting a magnified portion of the interactive image corresponding with the predefined zoomspot, wherein the magnified portion is presented in accordance with a predetermined location within the interactive image and a predetermined quality of the interactive image.

16. The computer-readable storage media of claim 15, wherein the zoomspot and zoomspot indicator are anchored to pixel coordinates within the interactive image.

17. The computer-readable storage media of claim 15, wherein the magnified portion of the image is presented at least by focusing a scope of the interactive image in accordance with the predetermined location.

18. The computer-readable storage media of claim 17, wherein the magnified portion of the interactive image is presented based on progressively downloading one or more image tiles that correspond with the magnified portion of the interactive image to yield a higher resolution.

19. The computer-readable storage media of claim 18, wherein the magnified portion of the initial image is further presented in accordance with a predetermined animated zoom path.

20. The computer-readable storage media of claim 19, wherein the predetermined zoom path comprises a linear regression zoom path, a center and zooming path, or a customized zoom path.

* * * * *